United States Patent
Von Alberti

(10) Patent No.: US 10,378,575 B2
(45) Date of Patent: Aug. 13, 2019

(54) THERMALLY FRAGMENTABLE FASTENING DEVICE

(71) Applicant: Airbus DS GmbH, Taufkirchen (DE)

(72) Inventor: Mathias Von Alberti, Markdorf (DE)

(73) Assignee: AIRBUS DS GMBH, Taufkirchen (DE)

( * ) Notice: Subject to any disclaimer, the term of this patent is extended or adjusted under 35 U.S.C. 154(b) by 265 days.

(21) Appl. No.: 15/473,289

(22) Filed: Mar. 29, 2017

(65) Prior Publication Data

US 2017/0284443 A1    Oct. 5, 2017

(30) Foreign Application Priority Data

Mar. 31, 2016 (DE) .................. 10 2016 205 326

(51) Int. Cl.
| | | |
|---|---|---|
| F16B 31/00 | (2006.01) | |
| B64G 1/62 | (2006.01) | |
| B64G 1/64 | (2006.01) | |

(52) U.S. Cl.
CPC .............. *F16B 31/007* (2013.01); *B64G 1/62* (2013.01); *B64G 1/64* (2013.01); *B64G 1/645* (2013.01); *F16B 31/00* (2013.01)

(58) Field of Classification Search
CPC ................ F16B 31/007; F16B 37/0885; F16B 37/0892; F16B 31/00; B64G 1/62; B64G 1/64; B64G 1/645
USPC .......................... 411/390, 396–397, 423–433
See application file for complete search history.

(56) References Cited

U.S. PATENT DOCUMENTS

| | | | | |
|---|---|---|---|---|
| 2,405,412 A | * | 8/1946 | Eby | .......................... H01R 4/32 411/396 |
| 2,985,898 A | | 5/1961 | Goude | |
| 3,260,204 A | * | 7/1966 | Wilkey, Jr. | .............. F42B 10/30 102/378 |
| 3,526,382 A | * | 9/1970 | Coker | ................... F16B 21/165 220/751 |
| 6,033,169 A | * | 3/2000 | Bettger | ............... F16B 37/0857 411/267 |
| 6,661,331 B2 | | 12/2003 | Valembois et al. | |
| 6,712,574 B1 | * | 3/2004 | Roopnarine | ........ F16B 37/0857 411/267 |
| 8,142,124 B2 | * | 3/2012 | Kulesha | ................ F16B 41/002 411/149 |

(Continued)

FOREIGN PATENT DOCUMENTS

| | | |
|---|---|---|
| DE | 60206835 T2 | 4/2006 |
| EP | 3085627 A1 | 10/2016 |

(Continued)

OTHER PUBLICATIONS

European Search Report for corresponding European Patent Application No. 17162305.

(Continued)

*Primary Examiner* — Roberta S Delisle

(74) *Attorney, Agent, or Firm* — Greer, Burns & Crain, Ltd.

(57) ABSTRACT

A fastening device for use in a spacecraft comprises a shaft and a head, which is connected by a first solder to the shaft. The first solder comprises a material of which the melting point is lower than the temperature acting on the fastening device on re-entry of a spacecraft equipped with fastening device into the earth's atmosphere.

19 Claims, 2 Drawing Sheets

(56) References Cited

U.S. PATENT DOCUMENTS

| | | | |
|---|---|---|---|
| 8,708,629 B2* | 4/2014 | Smith | F16B 39/32 |
| | | | 411/267 |
| 2008/0008556 A1* | 1/2008 | Dvorak | F16B 37/0821 |
| | | | 411/433 |
| 2017/0327251 A1 | 11/2017 | Parissenti et al. | |

FOREIGN PATENT DOCUMENTS

| | | |
|---|---|---|
| FR | 2847011 A1 | 5/2004 |
| RU | 2008113944 A | 10/2009 |
| WO | 2014045078 A1 | 3/2014 |
| WO | 2016088044 A1 | 6/2016 |

OTHER PUBLICATIONS

German Office Action for corresponding German Patent Application No. 102016205326.4.
S. Heinrich, "Trade-Off Atmospheric Re-entry, Design for Demise vs Controlled Re-entry", Springer International Publishing, Switzerland 2015, pp. 423-436.

* cited by examiner

US 10,378,575 B2

THERMALLY FRAGMENTABLE FASTENING DEVICE

CROSS-REFERENCES TO RELATED APPLICATIONS

This application claims the benefit of the German patent application No. 10 2016 205 326.4 filed on Mar. 31, 2016, the entire disclosures of which are incorporated herein by way of reference.

BACKGROUND OF THE INVENTION

The invention relates to a thermally fragmentable fastening device, a spacecraft component assembly comprising such a thermally fragmentable fastening device and a spacecraft equipped with such a fastening device and/or such a spacecraft component assembly.

Satellites are often too big to burn up completely on re-entry into the earth's atmosphere following their useful life in space. To avoid any damage on earth due to debris, satellites are therefore either brought to a controlled crash or fragmented before re-entry into the earth's atmosphere. To fragment satellite structures, electrically activated separation mechanisms and/or pyrotechnic mechanisms can be used, for example.

SUMMARY OF THE INVENTION

An object of the invention is to provide a fastening device that can be realized at low cost and simply and reliably facilitates a fragmenting of spacecraft structures, in particular satellite structures, on re-entry into the earth's atmosphere. Another object of the invention is to specify a spacecraft component assembly comprising such a fastening device as well as a spacecraft equipped with such a spacecraft component assembly.

A fastening device suitable for use in a spacecraft, in particular a satellite, comprises a shaft and a head connected to the shaft. The head of the fastening device is connected to the shaft preferably in the area of a first end of the shaft and can enclose the shaft, which is formed to be circular cylindrical, for example. For example, the shaft can be taken up in an opening formed in the head. The head is connected to the shaft by a first solder, which comprises a material with a melting point that is lower than the temperature acting on the fastening device upon re-entry of a spacecraft equipped with the fastening device into the earth's atmosphere. Due to the melting of the first solder, the connection between the head and the shaft of the fastening device loses its strength, so that the head and the shaft of the fastening device are detached from one another on re-entry of the spacecraft into the earth's atmosphere.

Due to the separation of the head from the shaft, the fastening device loses its integrity and thus its fastening function. In consequence, components of a spacecraft, which are connected to one another by the fastening device, are detached from one another as soon as the temperature acting on the fastening device exceeds the melting point of the first solder on re-entry of the spacecraft into the earth's atmosphere and a thermally induced fragmentation of the fastening device ensues accordingly. Since the components detached from one another have a reduced volume compared with the volume of the spacecraft overall, as well as having a reduced mass compared with the mass of the spacecraft overall, it can be guaranteed that these components burn up completely on re-entry into the earth's atmosphere. Bringing the spacecraft to a controlled crash can be eliminated by this.

The fragmentation of the fastening device, i.e., the separation of the head from the shaft of the fastening device, is based on a single physical effect, namely the melting of the first solder used to connect the head to the shaft. An electric controller or another actuator, which triggers the fragmentation of the fastening device, is not therefore necessary. Moreover, it is guaranteed that the fragmentation of the fastening device still functions reliably even after a longer deployment of the fastening device in space. The fastening device thus facilitates a reliable fragmentation of spacecraft structures on re-entry into the earth's atmosphere in a simple, low-cost manner.

Depending on the design of the spacecraft and the arrangement of the fastening device in the spacecraft, different temperatures may prevail in the area of the fastening device and act on the fastening device on re-entry of the spacecraft into the earth's atmosphere. For example, temperatures of over 1500° C. can occur in the area of an outer surface of the spacecraft on re-entry into the earth's atmosphere due to the friction heat arising. In contrast to this, the temperatures to which the fastening device is exposed on re-entry of the spacecraft into the earth's atmosphere can be lower if the fastening device is installed in a comparatively protected manner in the interior of the spacecraft. The choice of material for the first solder is therefore preferably made depending on the design of the spacecraft and depending on the arrangement of the fastening device in the spacecraft so that it is ensured that the first solder melts and the head and the shaft of the fastening device detach from one another accordingly when a spacecraft in which the fastening device is installed re-enters the earth's atmosphere, for example when its useful life in space has come to an end.

Various materials can generally be used to manufacture the first solder. However, the first solder is preferably a lead-free tin-silver solder, in particular Sn96Ag4. This material melts at a temperature of approx. 220° C. It is thereby ensured that on re-entry of a spacecraft equipped with the fastening device into the earth's atmosphere, the first solder melts completely and thus the fastening device, and consequently the spacecraft, fragment in the desired manner.

In a preferred embodiment of the fastening device, the head of the fastening device is formed in multiple parts and comprises a plurality of head segments. For example, the head of the fastening device can have three head segments, which can be formed symmetrically or asymmetrically and arranged in the area of a first end of the shaft around an outer circumference of the shaft. The head segments are preferably connected to one another by the first solder. For example, the head segments can be connected to one another by the first solder along contact surfaces, which extend in a radial direction of the head substantially perpendicular to a longitudinal axis of the shaft. It is ensured in a structurally simple manner by a multi-part configuration of the head of the fastening device that the head of the fastening device detaches reliably from the shaft of the fastening device on melting of the first solder.

In a preferred embodiment, the fastening device further comprises a circumferential band, which encompasses at least a section of an outer circumferential surface of the head of the fastening device. In particular, the circumferential band preferably encompasses at least sections of the outer surfaces of the head segments forming the head of the fastening device. The circumferential band can be a band-shaped element comprising a metal material, which is manufactured, for example, from a sheet metal part. In its state connected to the head of the fastening device, the circumferential band preferably has a hollow cylindrical form.

The circumferential band can be connected to the head of the fastening device by a second solder. For example, the circumferential band can be soldered onto at least sections of the outer surfaces of the head segments forming the head of the fastening device Similar to the first solder, the second solder preferably comprises a material of which the melting point is lower than the temperature acting on the fastening device upon re-entry of a spacecraft equipped with the fastening device into the earth's atmosphere. Due to the melting of the second solder, the connection between the circumferential band and the head of the fastening device loses its strength, so that the circumferential band is detached from the head of the fastening device, in particular from the outer surfaces of the head segments, on re-entry of a spacecraft equipped with the fastening device into the earth's atmosphere. It is ensured by this that the separation of the head or the head segments from the shaft of the fastening device is not obstructed by the circumferential band on re-entry of the spacecraft into the earth's atmosphere.

The second solder can basically have the same melting point as the first solder, as then it is at least guaranteed that the circumferential band detaches from the head of the fastening device when the separation of the head of the fastening device from its shaft takes place as a consequence of the melting of the first solder. Preferably, however, the second solder comprising a material that has a lower melting point than the material of the first solder. Due to this, when manufacturing the fastening device, the head can first be soldered to the shaft of the fastening device, and the circumferential band only then connected by soldering to the head of the fastening device without damaging the solder connection already produced between the head and the shaft of the fastening device when soldering the circumferential band. The quality of the solder connection(s) between the head and the shaft and/or the head and the circumferential band can be assessed by X-ray examinations and/or loading tests.

The second solder is preferably a lead-free tin-bismuth solder, in particular Sn43Bi57. This material melts at a temperature of approx. 150° C. The second solder can then be processed at temperatures at which damage to an already existing solder connection produced by means of the first solder can safely be excluded.

The head of the fastening device is preferably provided with webs in the area of its outer surface for threading in the circumferential band. In a head formed in multiple parts, each head segment preferably has at least one web for threading in the circumferential band. Even on melting of the second solder and even after the second solder has melted completely, the circumferential band remains connected to the individual head segments by the webs.

The circumferential band preferably has a spring pretensioning by which the circumferential band is pretensioned into a flat shape. For example, the circumferential band is pressed by its spring pretensioning from a hollow cylindrical shape, which the circumferential band assumes in its state connected to the head of the fastening device, into a flat shape. Upon melting of the first solder, the circumferential band accordingly exerts a force on the head segments of a fastening device head formed of multiple parts, which force separates the individual head segments from one another and furthermore detaches them from the shaft of the fastening device. The fragmentation of the fastening device is advantageously supported by this.

The head and/or the shaft of the fastening device comprises(s) preferably titanium or of a titanium alloy. In addition or alternatively to this, the circumferential band can also comprise titanium or a titanium alloy. Before the soldering of the head or the head segments to the shaft, the soldering of the head segments to one another and/or the soldering of the circumferential band to the head or the head segments, all surfaces to be soldered can be surface-treated, in particular cleaned and/or provided with an Ag layer. The solder connections can be produced by vacuum vapor phase soldering.

In a preferred embodiment of the fastening device, the shaft is provided in the area of its end lying opposite the head with an outer thread. The fastening device is then executed in the form of a bolt.

A spacecraft component assembly comprises a first spacecraft component and a second spacecraft component. The first spacecraft component can be formed, for example, in the form of a supporting structure, while the second spacecraft component can be a payload, for example. The first and the second spacecraft component are connected to one another by a fastening device described above. On re-entry of a spacecraft equipped with the spacecraft component assembly into the earth's atmosphere, the fastening device, as described above, loses its integrity and thus its fastening function, due to which the two spacecraft components connected to one another by the fastening device are detached from one another. It can be guaranteed by this that the spacecraft components burn up completely on re-entry into the earth's atmosphere.

The first spacecraft component can have a hole, which is provided with an inner thread to cooperate with the outer thread provided on the shaft of the fastening device. To connect the first spacecraft component to the second spacecraft component, the fastening device can then be guided through a through opening formed in the second spacecraft component, for example, and screwed in the hole formed in the first spacecraft component. The head of the fastening device can then sit on a surface of the second spacecraft component, for example, facing away from the first spacecraft component.

In a preferred embodiment of the spacecraft component assembly, the shaft of the fastening device has an area with an enlarged outer diameter in the area of its end connected to the head. The area formed on the shaft of the fastening device with an enlarged outer diameter can have the shape, for example, of a spherical cap. A through opening can further be provided in the second spacecraft component. The inner diameter of the through opening formed in the second spacecraft component is, in particular, larger than an outer diameter of the area with an enlarged outer diameter formed on the shaft of the fastening device. It can be ensured by such a configuration of the spacecraft component assembly that the second spacecraft component assembly can slide over the area of the shaft of the fastening device with an enlarged outer diameter and detach itself from the first spacecraft component as soon as the thermally induced fragmentation of the fastening device has taken place.

A spacecraft is equipped with a fastening device described above and/or a spacecraft component assembly described above.

BRIEF DESCRIPTION OF THE DRAWINGS

Preferred embodiments of the invention are now explained with reference to the enclosed schematic drawing, of which

DETAILED DESCRIPTION OF THE PREFERRED EMBODIMENTS

Figure 1:
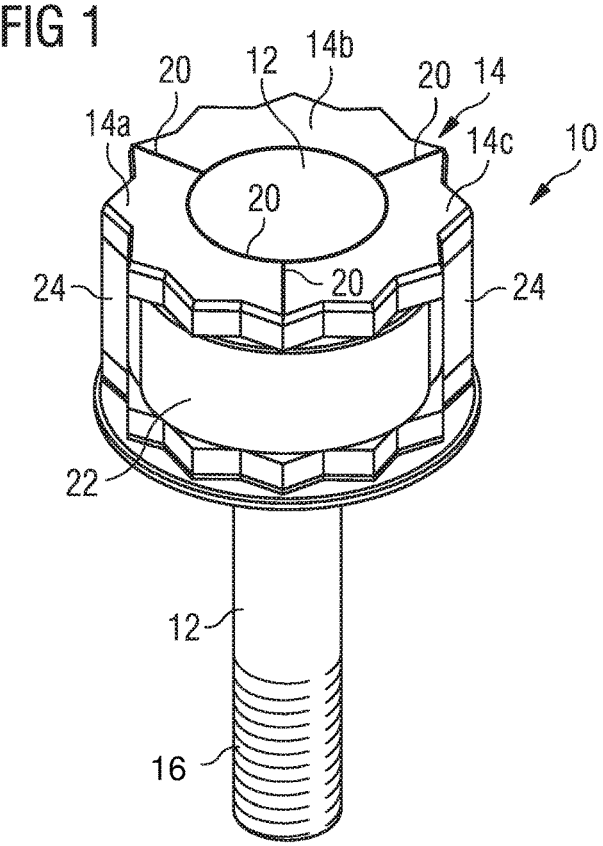
FIG. 1 shows a three-dimensional view of a thermally fragmentable fastening device suitable for use in an aircraft.

A fastening device 10 shown in FIGS. 1 to 4, which is provided for use in a spacecraft, comprises a shaft 12 and a head 14. In the embodiment shown here, the fastening device 10 is formed in the form of a bolt. The shaft 12 is therefore provided with an outer thread 16 in the area of its end lying opposite the head 14. The head 14 of the fastening device 10 is formed in multiple parts and here comprises three head segments 14a, 14b, 14c, which are formed symmetrically and enclose the circular cylindrical shaft 12. A hollow cylinder is thus defined by the three head segments 14a, 14b, 14c with an opening in which the shaft 12 is taken up. In the area of its end connected to the head 14, the shaft 12 has an area 18 with an enlarged outer diameter. In the embodiment of the fastening device 10 shown in the figures, this area 18 is formed with an enlarged outer diameter in the form of a spherical cap.

The head 14, i.e., the head segments 14a, 14b, 14c are connected by a first solder 20 to the shaft 12. The first solder 20 used to connect the head segments 14a, 14b, 14c to the shaft 12 is provided in the area of a boundary surface between an inner surface of the head segments 14a, 14b, 14c facing the shaft 12 and an outer surface of the shaft 12 facing the head segments 14a, 14b, 14c. Moreover, the head segments 14a, 14b, 14c are also connected to one another by the first solder 20. To achieve this, the first solder is also applied along contact surfaces of the head segments 14a, 14b, 14c, which extend in a radial direction of the head 14 and substantially perpendicular to a longitudinal axis L of the shaft 12.

A circumferential band 22 encompasses a central area of an outer surface of the head 14, meaning the head segments 14a, 14b, 14c. The head 14 is provided in the area of its outer circumferential surface with webs 24 for threading in the circumferential band 22. In particular, in the embodiment of the fastening device 10 shown in the figures, each head segment 14a, 14b, 14c has a web 24 extending substantially parallel to an outer surface of the head segment 14a, 14b, 14c, into which web the circumferential band 22 is threaded and can thus be connected at least loosely to the head segment 14a, 14b, 14c. Moreover, the circumferential band 22 is connected by a second solder 26 to the head 14, i.e., the head segments 14a, 14b, 14c. In particular, the second solder 26 is applied in the area of a boundary surface between the outer surface of the head segments 14a, 14b, 14c facing the circumferential band 22 and an inner surface of the circumferential band 22 facing the head segments 14a, 14b, 14c. The circumferential band 22, which in the state connected to the head 14 of the fastening device 10 assumes a substantially hollow cylindrical shape, has a spring pretensioning that pretensions the circumferential band 22 into a flat shape.

The shaft 12, the head 14 and the circumferential band 22 each comprising titanium or a titanium alloy. The second solder 26 comprises a material that has a lower melting point than the material of the first solder 20. Due to this, first the head segments 14a, 14b, 14c can be soldered to the shaft 12 and to one another during manufacture of the fastening device 10. Then the circumferential band 22 can be connected by soldering to the head 14, i.e., the head segments 14a, 14b, 14c of the fastening device 10 without damaging the solder connections already produced between the head 14 and the shaft 12 as well as between the head segments 14a, 14b, 14c when soldering the circumferential band 22 on.

Before the soldering of the head 14 or the head segments 14a, 14b, 14c to the shaft 12, the soldering of the head segments 14a, 14b, 14c to one another and/or the soldering of the circumferential band 22 to the head 14 or the head segments 14a, 14b, 14c, all surfaces to be soldered can be surface-treated, in particular cleaned and/or provided with an Ag layer. The solder connections can be produced by vacuum vapor phase soldering. The quality of the solder connection(s) between the head 14 and the shaft 12, between the head segments 14a, 14b, 14c and/or between the head segments 14a, 14b, 14c and the circumferential band 22 can be assessed by X-ray examinations and/or loading tests.

The melting point of the material of the second solder 26 is lower than a temperature that acts on the fastening device upon re-entry of a spacecraft equipped with the fastening device 10 into the earth's atmosphere. The melting point of the material of the first solder 20 is also lower than the temperature that acts on the fastening device upon re-entry of a spacecraft equipped with the fastening device 10 into the earth's atmosphere. Thus, upon re-entry into the earth's atmosphere of a spacecraft equipped with the fastening device 10, fragmentation of the fastening device 10 takes place due to the melting of the solder connections.

In particular, upon re-entry into the earth's atmosphere of a spacecraft equipped with the fastening device 10, first the second solder 26 melts, due to which the circumferential band 22, i.e., the inner surface of the circumferential band 22 facing the head segments 14a, 14b, 14c detaches itself from the outer surfaces of the head segments 14a, 14b, 14c. However, due to the webs 24, the circumferential band 22 remains connected to the individual head segments 14a, 14b, 14c. If the melting point of the first solder 20 is also exceeded in the further course of the re-entry into the earth's atmosphere, the first solder 20 also melts, due to which the head segments 14a, 14b, 14c detach from the shaft 12 in the area of their inner surfaces facing the shaft 12. Moreover, the connection existing between the individual head segments 14a, 14b, 14c in the area of the contact surfaces running in a radial direction of the head 14 and substantially perpendicular to the longitudinal axis L of the shaft 12 is also released.

Due to spring pretensioning of the circumferential band 22, the circumferential band 22, which is no longer connected to the outer surfaces of the head segments 14a, 14b, 14c due to the melting of the second solder 26, is pressed from its hollow cylindrical shape, which the circumferential band 22 assumes in its state connected to the head 14, i.e., the head segments 14a, 14b, 14c of the fastening device 10, into a flat shape. The circumferential band 22 accordingly exerts a force on the head segments 14a, 14b, 14c that separates the individual head segments 14a, 14b, 14c from one another and moreover from the shaft 12 of the fastening device 10, see FIG. 4b in particular.

Depending on the design of the spacecraft in which the fastening device 10 is installed, and the arrangement of the fastening device 10 in the spacecraft, different temperatures may prevail in the area of the fastening device 10 and act on the fastening device 10 on re-entry of the spacecraft into the earth's atmosphere. The choice of material for the first and the second solder 20, 26 is therefore preferably to be made depending on the design of the spacecraft and depending on the arrangement of the fastening device 10 in the spacecraft so that it is ensured that the first and the second solder 20, 26 melt and the fastening device 10, as described above, fragments when a spacecraft in which the fastening device 10 is installed re-enters the earth's atmosphere, for example when its useful life in space has come to an end.

Various materials can generally be used to manufacture the first and the second solder 20, 26. However, the first solder is preferably a lead-free tin-silver solder, in particular Sn96Ag4. This material melts at a temperature of approx. 220° C. The second solder 26, on the other hand, can be a lead-free tin-bismuth solder, in particular Sn43Bi57. This material has a melting point of approx. 150° C.

Figure 2:
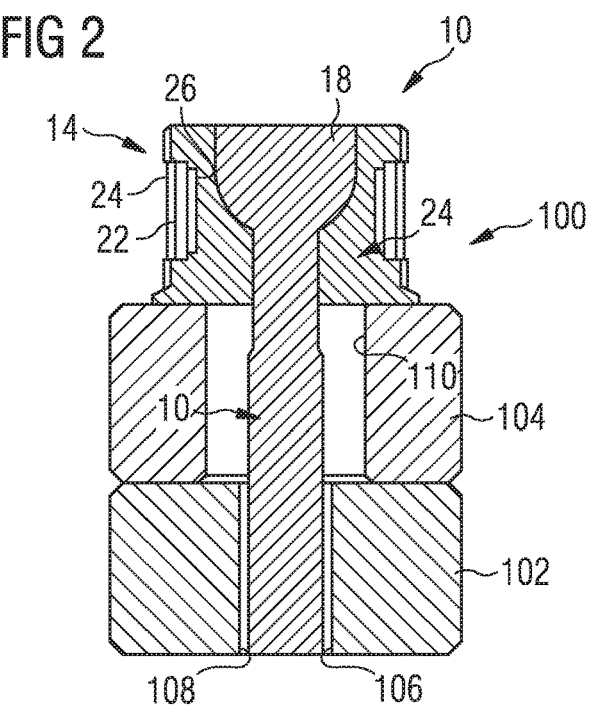
FIG. 2 shows a sectional view of a spacecraft component assembly comprising the fastening device according to FIG. 1.
Figure 3:
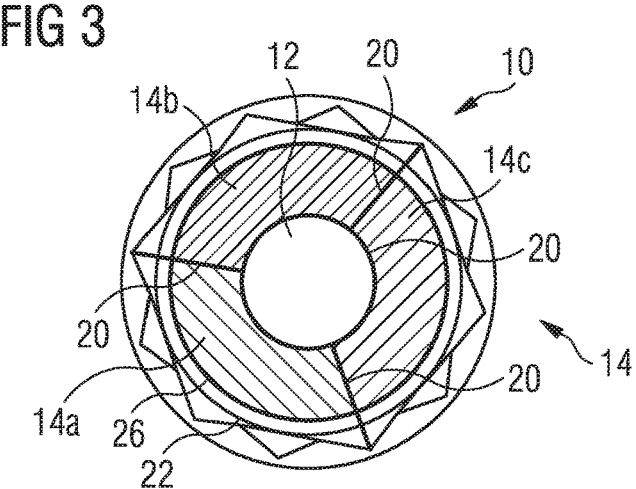
FIG. 3 shows a plan view of the fastening device according to FIG. 1 and FIGS. 4a and b illustrate a fragmentation of the fastening device under the influence of an increased temperature.
Figure 4A:
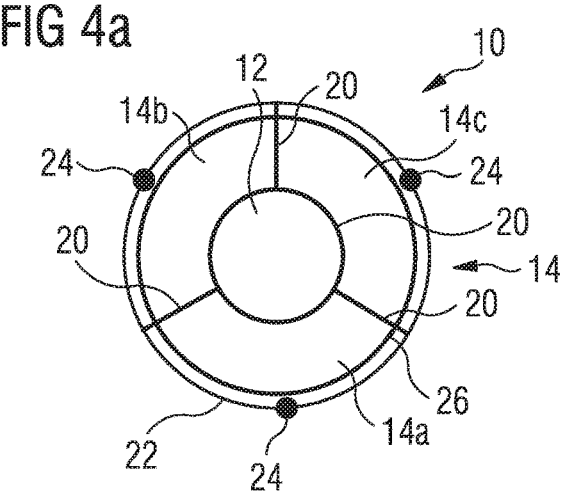
Figure 4B:
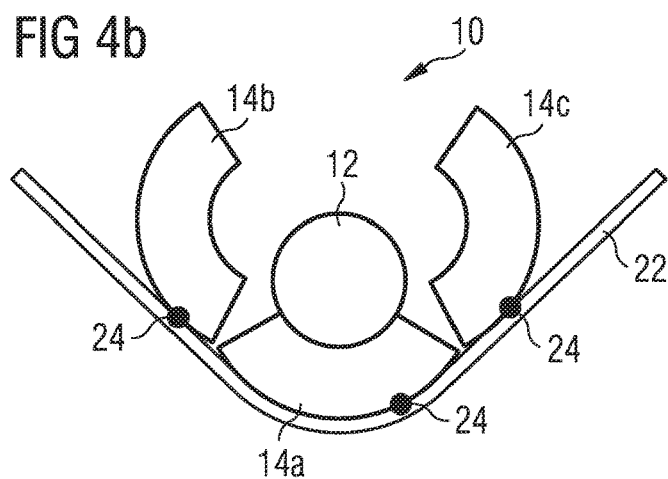

A spacecraft component assembly 100 comprising the fastening device 10 is illustrated in FIG. 2. The spacecraft component assembly 100 comprises a first spacecraft component 102 formed here in the form of a supporting structure and a second spacecraft component 104 formed here in the form of a payload. The first and the second spacecraft component 102, 104 are connected to one another by the fastening device 10. In particular, the first spacecraft component 102 has a hole 106, which is provided with an inner thread 108 to cooperate with the outer thread 16 provided on the shaft 12 of the fastening device 10. In the second spacecraft component 104, on the other hand, a through opening 110 is formed with an inner diameter that is larger than the outer diameter of the area 18 with an enlarged outer diameter formed on the shaft 12 of the fastening device 10. To connect the first spacecraft component 102 to the second spacecraft component 104, the fastening device 10 is guided through the through opening 110 formed in the second spacecraft component 104 and screwed in the hole 106 formed in the first spacecraft component 102, so that the head 14 of the fastening device 10 sits on a surface of the second spacecraft component 104 facing away from the first spacecraft component 102.

Upon re-entry of a spacecraft equipped with the spacecraft component assembly 100 into the earth's atmosphere, the fastening device 10, as described above, loses its integrity and thus its fastening function, due to which the two spacecraft components 102, 104 connected to one another by the fastening device 10 are detached from one another. The dimensioning of the through opening 110 formed in the second spacecraft component 104 ensures here that even the area 18 with an enlarged diameter formed on the shaft 12 of the fastening device 10 does not obstruct the separation of the two spacecraft components 102, 104. Since the spacecraft components 102, 104 detached from one another have a reduced volume compared with the volume of the overall spacecraft component assembly 100, it can be guaranteed that the individual components 102, 104 burn up completely on re-entry into the earth's atmosphere.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening device for use in a spacecraft, which comprises:
   a shaft, and
   a head, which is connected to the shaft by a first solder, wherein the first solder comprises a material, the melting point of which is lower than the temperature acting on the fastening device upon re-entry of a spacecraft equipped with the fastening device into the earth's atmosphere, wherein the head of the fastening device is formed of multiple parts and comprises a plurality of head segments, wherein the head segments are connected to one another by the first solder along contact surfaces, which extend in a radial direction of the head and substantially perpendicular to a longitudinal axis of the shaft.

2. The fastening device according to claim 1, wherein the first solder is a lead-free tin-silver solder.

3. The fastening device according to claim 2, wherein the first solder is Sn96Ag4.

4. The fastening device according to claim 1, further comprising a circumferential band encompassing at least a section of an outer circumferential surface of the head of the fastening device.

5. The fastening device according to claim 4, wherein the circumferential band is connected by a second solder to the head of the fastening device, wherein the second solder comprises a material with a melting point lower than the temperature acting on the fastening device upon re-entry of a spacecraft equipped with the fastening device into the earth's atmosphere.

6. The fastening device according to claim 5, wherein the second solder is a lead-free tin-bismuth solder.

7. The fastening device according to claim 6, wherein the second solder is Sn43Bi57.

8. The fastening device according to claim 4, wherein the second solder comprises a material that has a lower melting point than the material of the first solder.

9. The fastening device according to claim 4, wherein the head is provided in the area of its outer circumferential surface with webs for threading in the circumferential band.

10. The fastening device according to claim 4, wherein the circumferential band has a spring pretensioning, which pretensions the circumferential band into a flat shape.

11. The fastening device according to claim 4, wherein at least one of the shaft, the head and the circumferential band comprises titanium or a titanium alloy.

12. A spacecraft with a spacecraft component assembly according to claim 11.

13. The fastening device according to claim 1, wherein the shaft is provided in the area of its end lying opposite the head with an outer thread.

14. A spacecraft component assembly, which comprises:
   a first spacecraft component, and
   a second spacecraft component,
   wherein the first and the second spacecraft component are connected to one another by a fastening device according to claim 1.

15. The spacecraft component assembly according to claim 14, wherein the first spacecraft component has a hole, which is provided with an inner thread to cooperate with the outer thread provided on the shaft of the fastening device.

16. The spacecraft component assembly according to claim 14, wherein the shaft of the fastening device has an area with an enlarged outer diameter in the area of its end connected to the head and in the second spacecraft component a through opening is formed with an inner diameter larger than an outer diameter of the area with an enlarged outer diameter formed on the shaft of the fastening device.

17. A spacecraft with a fastening device according to claim 1.

18. A fastening device for use in a spacecraft, which comprises:
   a shaft, and
   a head, which is connected to the shaft by a first solder, wherein the first solder comprises a material, the melting point of which is lower than the temperature acting on the fastening device upon re-entry of a spacecraft equipped with the fastening device into the earth's atmosphere, and
   a circumferential band encompassing at least a section of an outer circumferential surface of the head of the fastening device.

19. The fastening device according to claim 18, wherein the second solder comprises a material that has a lower melting point than the material of the first solder.

\* \* \* \* \*